Feb. 13, 1934.  H. L. COBB  1,946,964

MAGNETIC MATERIAL AND PROCESS OF MAKING THE SAME

Filed July 11, 1933

Powdered ferrite, molded with a binder

Inventor
Howard L. Cobb,
By Potter, Pierce & Scheffler,
Attorneys.

Patented Feb. 13, 1934

1,946,964

UNITED STATES PATENT OFFICE 1,946,964

MAGNETIC MATERIAL AND PROCESS OF MAKING THE SAME

Howard L. Cobb, Boonton, N. J., assignor to Boonton Research Corporation, Boonton, N. J., a corporation of New Jersey Application July 11, 1933. Serial No. 679,945

20 Claims. (Cl. 175—21)

This invention relates to magnetic materials and processes for making the same, and particularly to magnetic materials for use in inductive fields at high frequencies.

An object of the invention is to provide novel magnetic materials that have permeability characteristics such that the materials are well adapted for use with the inductors of radio frequency circuits. An object is to provide magnetic material having a permeability very much greater than that of air and which, when subjected to an inductive field excited at radio frequency, will have a substantially constant permeability and low losses over a considerable range of frequencies. Objects are to provide magnetic materials which comprise mixtures or compounds of metallic monoxides and ferric oxide, and more particularly, materials which comprise mixtures or compounds of the oxides in relative proportions which impart a maximum permeability to the magnetic material. Other objects are to provide methods of manufacturing the novel magnetic materials, and of processing the same to obtain maximum permeability.

These and other objects and advantages of the invention will be apparent from the following specification when taken with the accompanying drawing, in which.

I have discovered that useful magnetic materials may be formed by sintering together compressed mixtures of iron sesquioxide (ferric oxide) and a monoxide of another metal, and that the permeability of the sintered product varies with the proportions of the oxides employed. When cupric and ferric oxides are powdered, mixed thoroughly and compressed hydraulically into a compact mass, then heated to 1000° C., the oxides sinter together and form a homogeneous mass whose magnetic permeability may be many times that of air. To determine the best mixture, the relative weights of CuO and $Fe_2O_3$ were varied in a series of samples from 50% CuO plus 50% $Fe_2O_3$ to 25% CuO plus 75% $Fe_2O_3$ and the permeability of these samples was measured. A sample corresponding to a composition of 33.3% by weight of CuO and 66.7% of $Fe_2O_3$ showed the highest permeability of the series. It is to be noted that the ratio of the molecular weights of the two oxides is:

$$\frac{CuO}{Fe_2O_3} = \frac{79.57}{159.7} = \frac{33.3}{66.7}$$

which corresponds to the ratio of weights giving maximum permeability. It was then deduced that a compound, namely copper ferrite ($CuFe_2O_4$ or $CuOFe_2O_3$), was formed which was responsible for the higher permeability.

Figure 1:
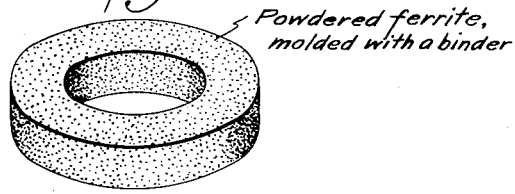
Fig. 1 is a perspective view of a core molded from the magnetic material.
Figure 2:
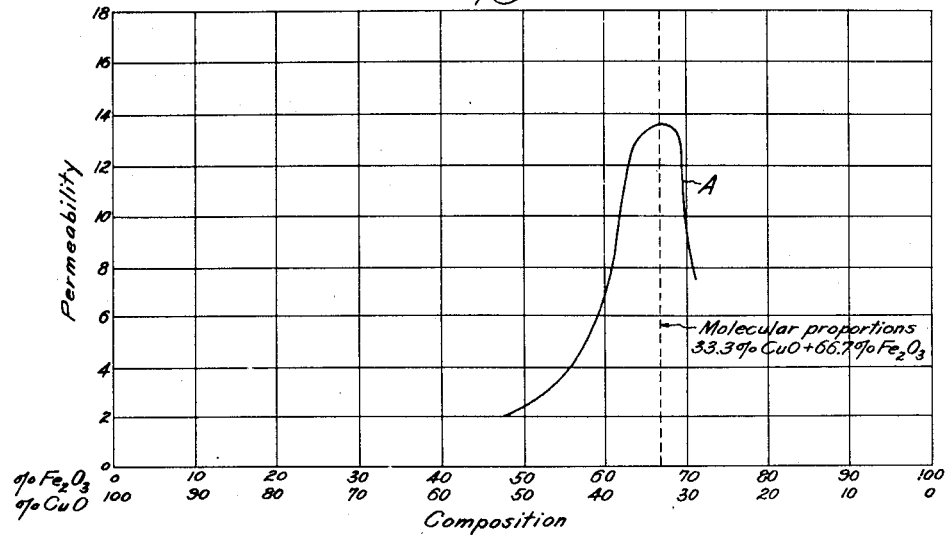
Fig. 2 is a curve sheet showing the relation between permeability and varying proportions of the oxides which make up the magnetic material.

In making the investigation of the relationship between permeability and content, all samples were prepared in the same manner and were molded into cores, as explained hereinafter, such as the toroid illustrated in Fig. 1. The experimentally determined relationship is shown by curve A of Fig. 2.

Compounds of other bivalent metallic monoxides with ferric oxide, namely lead, nickel, cadmium, zinc and calcium ferrites were produced in somewhat the same manner. They were all found to have considerably greater permeability than air and they can also be used to accomplish the same functions as copper ferrite, which is described here in more detail. My invention is not limited to copper ferrite since I have manufactured nickel ferrite ($NiFe_2O_4$), lead ferrite ($PbFe_2O_4$), cadmium ferrite ($CdFe_2O_4$), zinc ferrite ($ZnFe_2O_4$) and calcium ferrite ($CaFe_2O_4$), and found each and all to be much more magnetically permeant than air, particularly the lead and nickel ferrites.

Figure 3:
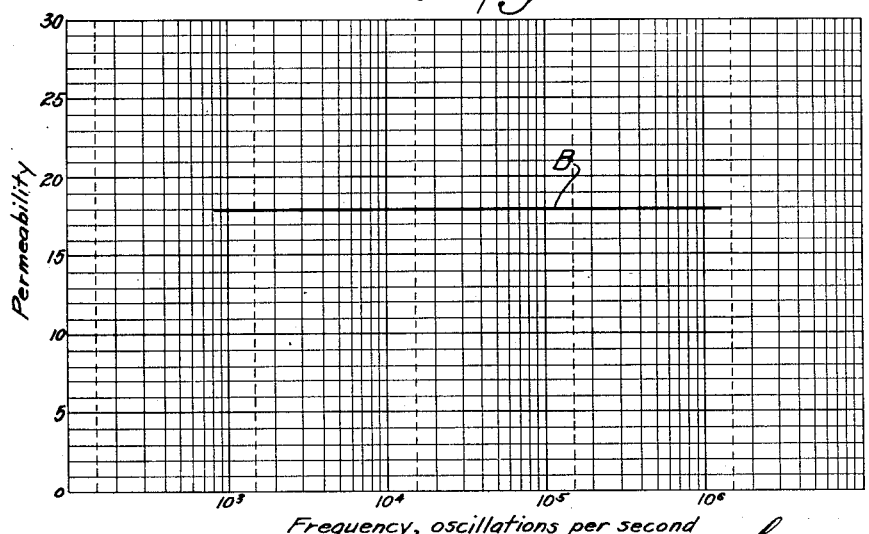
Fig. 3 is a curve sheet showing the observed relation between the effective permeability of one specimen of the magnetic material and the frequency of the inductive field in which the material was positioned.

A practical procedure which I have used in the manufacture of a magnetic material described above is as follows. Cupric oxide CuO and ferric oxide $Fe_2O_3$ in powder form were mixed in proportions corresponding to their molecular ratios in the compound $CuFe_2O_3$, namely 33.3% CuO and 66.7% $Fe_2O_3$ by weight. This mixture was pessed into a pellet in a hydraulic press and afterward fired in an electric furnace to 1000° C. for one hour, then removed and cooled in air. The sintered pellet was next ground to a powder fine enough to pass a 325 mesh screen. This powder was mixed with a suitable synthetic resin powder (of the type sold commercially under the names "Bakelite" and "Vinylite") in the proportion of 95% ferrite and 5% resin, then molded in the manner typical of Bakelite molding under pressure of 3,000 lbs. per square inch at 170° C. for two minutes. The permeability of a test toroid of this molded material at radio frequencies was measured as 13.3 with a deviation of less than 1% between 10 and 1000 kilocycles. The constant permeability over an extended range of frequencies is shown graphically by the curve B of Fig. 3.

There are also other methods of combining and treating cupric and ferric oxides to form copper ferrite, several of which follow.

By grinding a mixture of molecular proportions of the oxides in a ball mill with water as the suspending medium they were reduced to a very fine state and mixed quite intimately. This mixture after being dried, reduced to powder and molded under pressure, sintered together more thoroughly and apparently produced a better chemical combination between the oxides than was obtained when the oxides were not ground together, since the magnetic properties after firing were improved relative to the unground material.

Another satisfactory method employed for combining and molding these oxides consisted in grinding them in a ball mill as above explained to a very fine paste which, when partially dried to the consistency of putty, was molded into a suitable shape in somewhat the same manner as clay is molded. The sample thus shaped was dried slowly at 110° C. for several hours to remove the occluded water, then baked in an electric furnace, gradually raising the temperature to 1000° C. where it was kept for one hour, after which the sintered product was removed and cooled rapidly.

It was found that heat treatment of the sintered mass of oxides, insofar as rate of cooling is concerned, affects its permeability. If two samples of identical composition and history are fired alike and one is taken from the furnace and allowed to cool naturally in air and the other quenched in water, the latter will have 40% greater permeability.

In the course of my experiments, samples were produced according to the various methods outlined above whose permeability at radio frequency ran as high as 25.3.

The magnetic material herein described has a practical application in inductors used in radio frequency circuits. In a common radio set, for example, space is often an important issue, it being desirable to cut down the size of the various component parts as much as possible. Since coils for a given inductance can be made much smaller with a ferrite core material than with an air core due to the higher permeability, the total space occupied by the coils can be quite small. It is often desired to use fixed condensers and tune circuits by varying the inductance of coils. To this end cores of copper ferrite or other ferrites molded into a suitable form may be employed together with a mechanical means for moving them in and out of the inductive field of the coils.

My invention need not be limited to the application in inductors used in radio frequency circuits since the magnetic materials may be put to any use for which their particular characteristics are desirable.

I claim:

1. Magnetic core material comprising a sintered mixture of ferric oxide and a monoxide of another metal capable of chemically combining with said ferric oxide.

2. Magnetic core material comprising a sintered mixture of ferric oxide and a monoxide of another metal capable of chemically combining with said ferric oxide, said sintered mixture having the maximum permeability obtainable with mixtures of the said oxides.

3. Magnetic core material comprising a sintered mixture of ferric oxide and a monoxide of another metal capable of chemically combining with said ferric oxide, the said oxides being present in the mixture substantially in the ratio of their molecular weights.

4. Magnetic core material comprising a sintered mixture of cupric and ferric oxides.

5. Magnetic core material comprising a sintered mixture of cupric and ferric oxides, said sintered mixture having the maximum permeability obtainable with mixtures of the said oxides.

6. Magnetic core material comprising a sintered mixture of cupric and ferric oxides in substantially the proportion by weight of 67% of ferric oxide and 33% of cupric oxide.

7. The process of making a magnetic material which comprises mixing ferric oxide and a metallic oxide capable of chemical combination therewith, and sintering the mixture at a temperature of the order of 1000° C.

8. The process as claimed in claim 7, wherein the said oxides are mixed in substantially the proportion by weight of their molecular weights.

9. The invention as claimed in claim 7, in combination with the step of pressing the said mixture of oxides into a pellet before sintering the same.

10. The process as claimed in claim 7, wherein the said powdered oxides are mixed by wet grinding the same in a ball mill.

11. The process of making a magnetic material which comprises mixing in powder form ferric oxide and a metallic monoxide capable of chemical combination therewith, compressing the mixture to form the same into a pellet, sintering the pellet, and grinding the sintered pellet.

12. The process as claimed in claim 11, wherein the sintered pellet is cooled in air before grinding.

13. The process as claimed in claim 11, wherein the sintered pellet is quenched in water before grinding.

14. The process of forming a magnetic material which comprises mixing ferric oxide with the monoxide of a metal of the class comprising copper, nickel, lead, cadmium, zinc and calcium; and sintering the mixture to form a ferrite.

15. The process of making a magnetic core material which comprises mixing ferric oxide and the monoxide of another metal capable of chemical combination with the said ferric oxide, grinding a mixture of the said oxides in a ball mill with water, drying this mixture, reducing the dry mixture to powder, molding under pressure, and sintering the mixture.

16. The process of making a magnetic core material which comprises mixing ferric oxide and the monoxide of another metal capable of chemical combination with the said ferric oxide, grinding a mixture of the said oxides in a ball mill with water, drying this mixture, reducing the dry mixture to powder, molding under pressure, sintering the mixture, and cooling the sintered mixture by quenching in water.

17. The method of making a magnetic core material comprising a mixture of ferric oxide and the monoxide of another metal capable of combination with the said ferric oxide, which consists in grinding a mixture of said oxides in a ball mill with water, partially drying the mixture to the consistency of putty, molding the mixture into a suitable shape, drying slowly to remove the occluded water, baking the dried mixture while gradually raising the temperature to 1000° C., maintaining the mixture at a temperature of 1000° C. for one hour, and cooling the baked mixture.

18. The process as claimed in claim 17, wherein the baked mixture is cooled by quenching in water.

19. A magnetic core comprising a powdered ferrite and a binder, said ferrite comprising ferric oxide and the monoxide of another metal.

20. A magnetic core comprising powdered copper ferrite and a binder.

HOWARD L. COBB.